(12) United States Patent
Foor

(10) Patent No.: US 10,556,470 B2
(45) Date of Patent: Feb. 11, 2020

(54) ROTARY JOINT ASSEMBLY FOR A TIRE PRESSURE MANAGEMENT SYSTEM

(71) Applicant: Dana Heavy Vehicle Systems Group, LLC, Maumee, OH (US)

(72) Inventor: William J. Foor, Clayton, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 156 days.

(21) Appl. No.: 15/325,933

(22) PCT Filed: Jul. 15, 2015

(86) PCT No.: PCT/US2015/040484
§ 371 (c)(1),
(2) Date: Jan. 12, 2017

(87) PCT Pub. No.: WO2016/011101
PCT Pub. Date: Jan. 21, 2016

(65) Prior Publication Data
US 2017/0157998 A1    Jun. 8, 2017

Related U.S. Application Data

(60) Provisional application No. 62/024,679, filed on Jul. 15, 2014.

(51) Int. Cl.
*B60C 23/00*    (2006.01)
(52) U.S. Cl.
CPC .................................. *B60C 23/003* (2013.01)
(58) Field of Classification Search
CPC ...... B60C 23/00; B60C 23/001; B60C 23/003
See application file for complete search history.

(56) References Cited

U.S. PATENT DOCUMENTS

| 693,747 | A | | 2/1902 | Sinnott |
| 1,000,505 | A | | 8/1911 | Frykberg |
| 2,218,143 | A | * | 10/1940 | Birchfield ........... B60C 23/0467 152/417 |

(Continued)

OTHER PUBLICATIONS

International Search Report and Written Opinion for Application No. PCT/US2015/040484, date Oct. 1, 2015, issued by the European Patent Office.

*Primary Examiner* — Jason R Bellinger
(74) *Attorney, Agent, or Firm* — Marshall & Melhorn, LLC

(57) ABSTRACT

A rotary joint assembly for a tire pressure management system includes a rotating portion. The rotating portion has a first air passageway and a second air passageway. The first air passageway and the second air passageway are in fluid communication with a chamber formed in the rotating portion. The rotary joint assembly also includes a non-rotating portion. The non-rotating portion has a third air passageway. The third air passageway is in fluid communication with the second air passageway via a sealed space. The sealed space is provided between the rotating portion and the non-rotating portion. A valve assembly is positioned within the chamber. The valve assembly includes a piston and a biasing member. The valve assembly allows a flow of pressurized air to be directed from the first air passageway to the third air passageway or a flow of pressurized air to be directed from the third air passageway to the first air passageway.

20 Claims, 7 Drawing Sheets

(56) References Cited

U.S. PATENT DOCUMENTS

| | | |
|---|---|---|
| 2,633,889 A | 4/1953 | Vignini |
| 4,441,539 A * | 4/1984 | Hulse .................... B60C 23/003 |
| | | 137/624.14 |
| 4,498,515 A | 2/1985 | Holtzhauser et al. |
| 4,705,090 A | 11/1987 | Bartos |
| 4,765,385 A | 8/1988 | McGeachy |
| 5,979,526 A | 11/1999 | Chamoy |
| 6,145,558 A | 11/2000 | Schmitz |
| 6,412,515 B1 | 7/2002 | Hess |
| 6,550,511 B2 | 4/2003 | Nienhaus |
| 7,051,777 B2 | 5/2006 | Tarasinski et al. |
| 2005/0205182 A1* | 9/2005 | Maquaire .............. B60C 23/003 |
| | | 152/417 |
| 2009/0084481 A1 | 4/2009 | Kalavitz |
| 2014/0028016 A1 | 1/2014 | Knapke |
| 2017/0129293 A1* | 5/2017 | Knapke ................ B60C 23/003 |

\* cited by examiner

ROTARY JOINT ASSEMBLY FOR A TIRE PRESSURE MANAGEMENT SYSTEM

CROSS-REFERENCE TO RELATED APPLICATION

This application is claiming the benefit, under 35 U.S.C. 119(e), of the provisional U.S. patent application which was granted Ser. No. 62/024,679 and filed on Jul. 15, 2014, the entire disclosure of which is hereby incorporated by reference.

BACKGROUND OF THE INVENTION

This invention relates to a rotary joint assembly. In particular, this invention relates to a rotary joint assembly for a tire pressure management system.

Tire pressure management systems for vehicles such as, for example, central tire inflation systems are well-known. Tire pressure management systems are used to allow an operator to measure and adjust the tire pressure. Adjusting the tire pressure provides the vehicle with versatility for differing terrain types and reduces maintenance requirements. For example, the tire pressure may be decreased to provide additional traction for the vehicle or may be increased to reduce the rolling resistance of the vehicle.

Tire pressure management systems often employ a wheel valve to control the flow of pressurized air into and out of a tire. However, the wheel valves known in the art are complex and expensive. Also, due the position where the wheel valve is typically located, the wheel valve can be easily damaged during operation of the vehicle. Additionally, tire pressure management systems often employ a rotary joint to enable fluid communication between non-rotating elements of the tire pressure management system and the tire. However, the rotary joints known in the art are bulky and expensive.

Accordingly, it would be desirable to provide a rotary joint assembly that overcomes the deficiencies of the known designs.

BRIEF SUMMARY OF THE INVENTION

Embodiments of a rotary joint assembly for a tire pressure management system are provided.

In an embodiment, the rotary joint assembly comprises a rotating portion. The rotating portion has a first air passageway and a second air passageway. The first air passageway and the second air passageway are in fluid communication with a chamber formed in the rotating portion. A non-rotating portion has a third air passageway. The third air passageway is in fluid communication with the second air passageway via a sealed space provided between the rotating portion and the non-rotating portion. A valve assembly is positioned within the chamber. The valve assembly comprises a piston and a biasing member. The valve assembly allows a flow of pressurized air to be directed from the first air passageway to the third air passageway or a flow of pressurized air to be directed from the third air passageway to the first air passageway.

In another embodiment, the rotary joint assembly comprises a rotating portion. The rotating portion has a first air passageway and a second air passageway. The first air passageway and the second air passageway are in fluid communication with a chamber formed in the rotating portion. A non-rotating portion has a third air passageway. The third air passageway is in fluid communication with the second air passageway via a space provided between the rotating portion and the non-rotating portion. The space is sealed by a first annular air seal member and a second annular air seal member. A valve assembly is positioned within the chamber. The valve assembly comprises a piston and a biasing member. The biasing member applies a bias to the piston. The piston has a sealing surface which selectively provides a seal around an opening in a main body portion of the valve assembly. The valve assembly allows a flow of pressurized air to be directed from the first air passageway to the third air passageway or a flow of pressurized air to be directed from the third air passageway to the first air passageway.

DETAILED DESCRIPTION OF THE INVENTION

Figure 1:
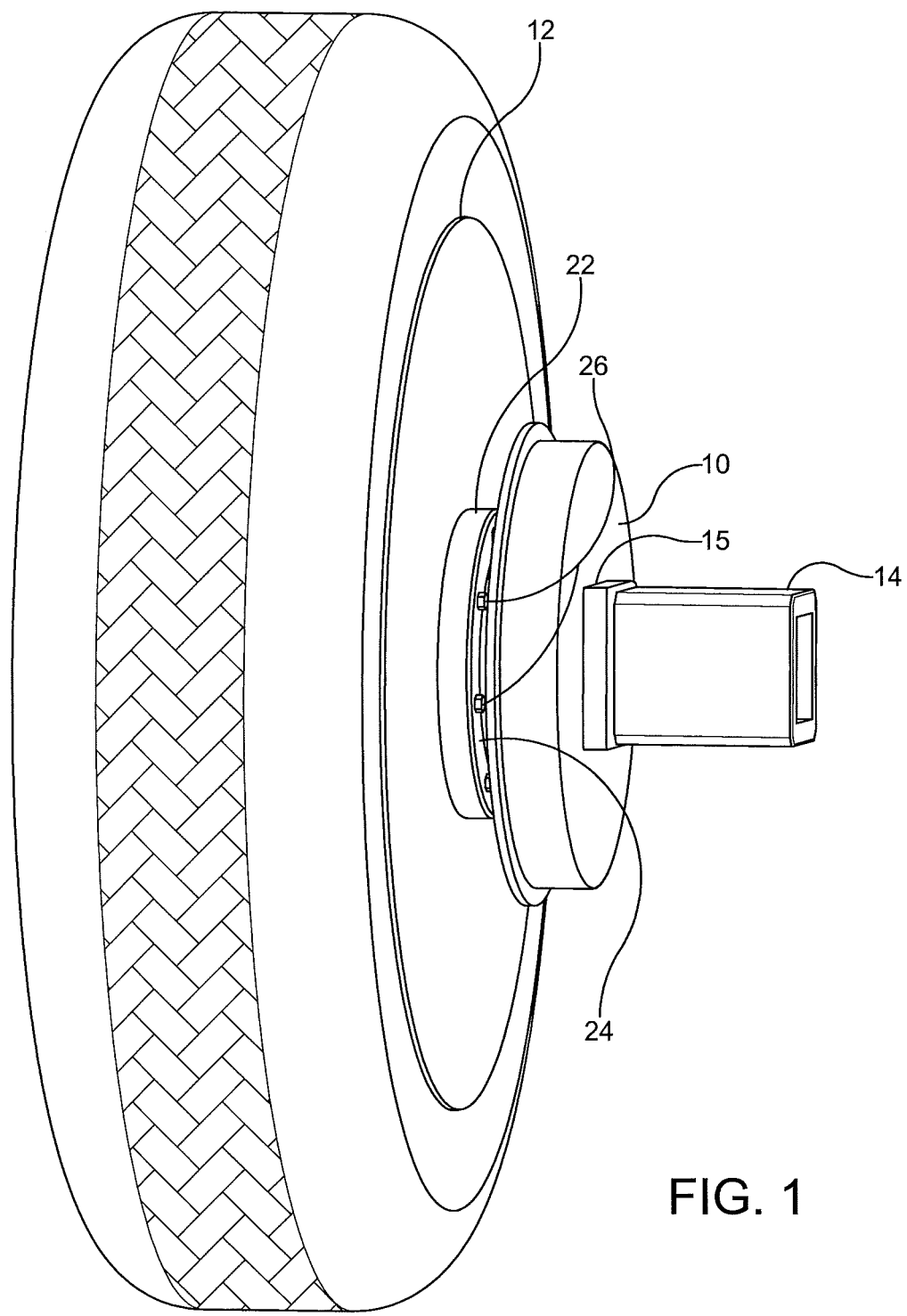
FIG. 1 is a perspective view of a wheel assembly, a portion of an axle housing, and an embodiment of a rotary joint assembly in accordance with the invention.

It is to be understood that the invention may assume various alternative orientations and step sequences, except where expressly specified to the contrary. It is also to be understood that the specific assemblies and processes illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

A rotary joint assembly 10 for a tire pressure management system will be described herein. Preferably, the tire pressure management system is a central tire inflation system. The tire pressure management system may be utilized with a vehicle (not depicted) such as, for example, a passenger, commercial or off-highway vehicles. Also, the system could have industrial, locomotive, and aerospace applications.

The rotary joint assembly 10 will be described for use in transferring a pressurized fluid such as, for example, when it is desired to increase or decrease the tire pressure of a wheel assembly 12. Preferably, the pressurized fluid is air. However, the rotary joint assembly is not limited to use with pressurized air as other fluids may be suitable for use with the rotary joint assembly.

Figure 2:
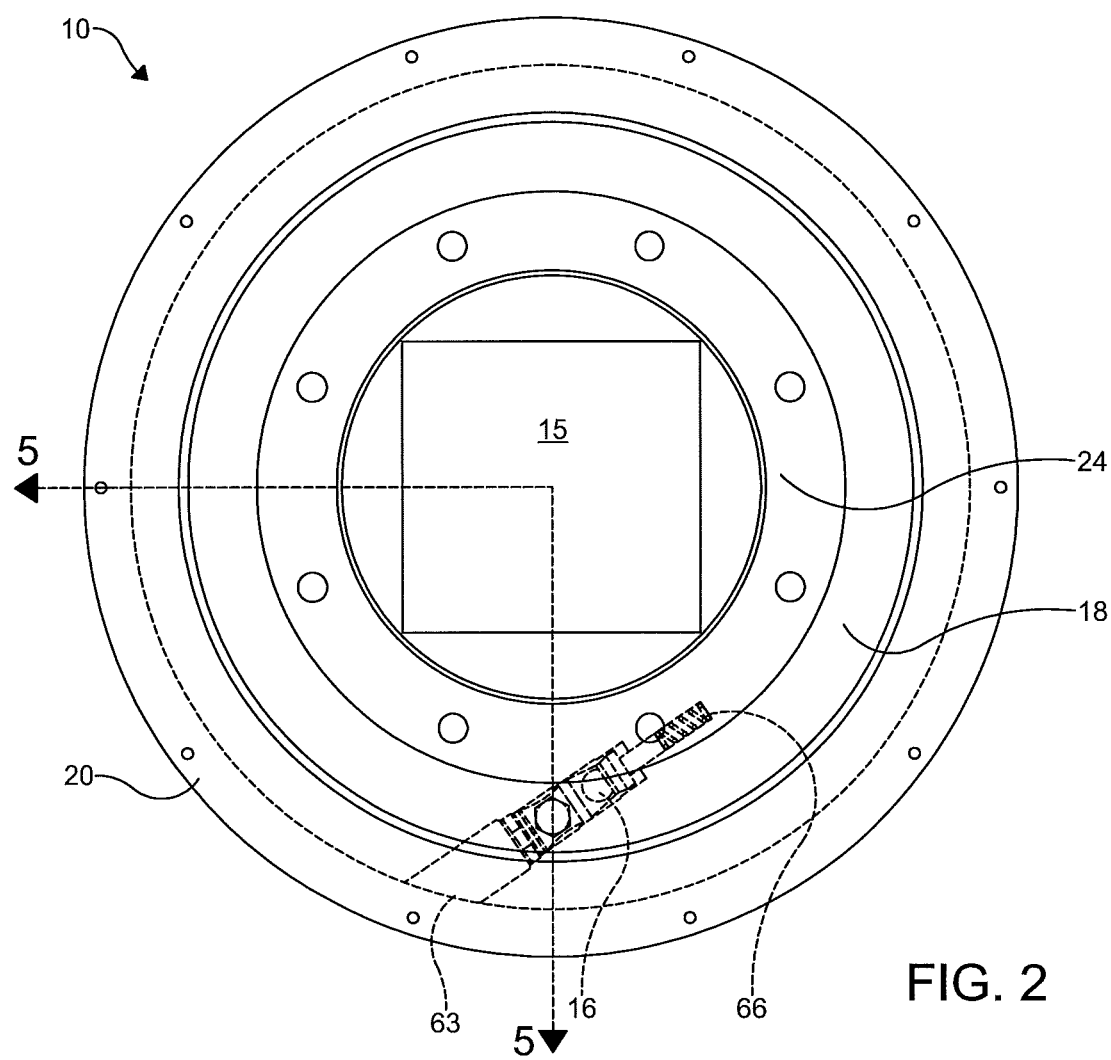
FIG. 2 is a plan view of the rotary joint assembly of FIG. 1.

Referring now to FIGS. 1-2, in an embodiment, the rotary joint assembly 10 is positioned around an axle housing 14. As illustrated in FIG. 1, the rotary joint assembly 10 has a central aperture 15 which is disposed around the axle housing 14. The rotary joint assembly 10 includes a valve assembly 16, a rotating portion 18 and a non-rotating portion 20.

The rotating portion 18 is attached to a wheel flange 22 for rotation therewith. A torque plate 24 is utilized to attach the rotating portion 18 to the wheel flange 22. The torque plate 24 is attached to the wheel flange 22 by one or more fasteners 26. The fasteners 26 extend through the torque plate 24 and into the wheel flange 22. As best illustrated in FIGS. 2-6, the torque plate 24 is an annular member and of a generally L-shape in cross-section. The torque plate 24 has a generally radially extending portion 28 and a generally axially extending portion 30. The radially extending portion 28 is attached to the wheel flange 22 on a side and the axially extending portion 30 on an opposite side. On an end, the axially extending portion 30 is attached to the radially extending portion 28. On an opposite end, the axially extending portion 30 is attached to an outboard surface 31 of the rotating portion 18.

The rotating portion 18 rotates relative to the non-rotating portion 20. The rotating portion 18 is a generally annular member and is disposed between opposite sidewalls 32, 34 and end walls 36, 38 of the non-rotating portion 20. In certain embodiments, the rotating portion 18 shares an axis of rotation 40 with an axle shaft (not depicted) provided within the axle housing 14. The axis of rotation 40 extends through the central aperture 15.

The rotating portion 18 has a first air passageway 42 which on an end communicates with the wheel assembly 12. The first air passageway 42 may have threads for connecting a fluid conduit (not depicted) therewith to enable fluid communication with the wheel assembly 12. Preferably, the first air passageway 42 is formed through the outboard surface 31 of the rotating portion 18. The first air passageway 42 may be of a cylindrical shape and provided in a parallel relationship with the axis of rotation 40. On an opposite end, the first air passageway 42 communicates with a chamber 44 provided in the rotating portion 18.

The rotating portion 18 has a second air passageway 46 which on an end communicates with a space 48 provided between the rotating portion 18 and non-rotating portion 20. The space 48 is sealed by providing a first annular air seal member 50 and a second annular air seal member 52 between the rotating portion 18 and non-rotating portion 20. The second air passageway 46 may be of a cylindrical shape and provided in a parallel relationship with the axis of rotation 40 and the first air passageway 42. On an opposite end, the second air passageway 46 communicates with the chamber 44 provided in the rotating portion 18. More particularly, the second air passageway 46 is in fluid communication with a second diameter portion 54 of the chamber 44.

The chamber 44 is defined by an interior wall portion 56 of the rotating portion 18 and is positioned generally oblique to the axis of rotation 40. Preferably, the chamber 44 comprises a first diameter portion 58, the second diameter portion 54 and a third diameter portion 60. Preferably, the first diameter portion 58, second diameter portion 54 and third diameter portion 60 are aligned with each other and are each of a general cylindrical shape. In an embodiment, the third diameter portion 60 is of a diameter which is greater than a diameter of the second diameter portion 54. Also, the second diameter portion 54 is of a diameter which is greater than a diameter of the first diameter portion 58.

The valve assembly 16 is provided within the rotary joint assembly 10. More particularly, the valve assembly 16 is provided in the chamber 44 to protect the valve assembly 16 from damage. Providing the valve assembly 16 in the chamber 44 also reduces the cost and complexity of the tire pressure management system. The valve assembly 16 allows the wheel assembly 12 and the tire pressure management system to be selectively in fluid communication.

Preferably, the valve assembly 16 is of the control variety. The valve assembly can be in an open position or a closed position. In an open position, the valve assembly 16 allows a flow of pressurized air to be transferred to and from the wheel assembly 12 to achieve a desired tire pressure. More particularly, in an open position, the valve assembly 16 allows a flow of pressurized air to be directed from the first air passageway 42 to a third air passageway 62 when the tire pressure is being decreased. Alternatively, when the tire pressure is being increased and the valve assembly 16 is in an open position, the valve assembly 16 allows a flow of pressurized air to be directed from the third air passageway 62 to the first air passageway 42.

In the chamber 44, the valve assembly 16 is positioned generally oblique to the axis of rotation 40. The valve assembly 16 is positioned in the chamber 44 by inserting it through an opening 63 in the chamber 44. The opening 63 is formed in an outermost surface 65 of the rotating portion 18 and the chamber 44 extends therefrom. Preferably, the valve assembly 16 is attached to the wall portion 56 defining the chamber 44 via a threaded connection. In this embodiment, a thread may be provided adjacent a closed end 86 of a main body portion 82 of the valve assembly 16.

Figure 7:
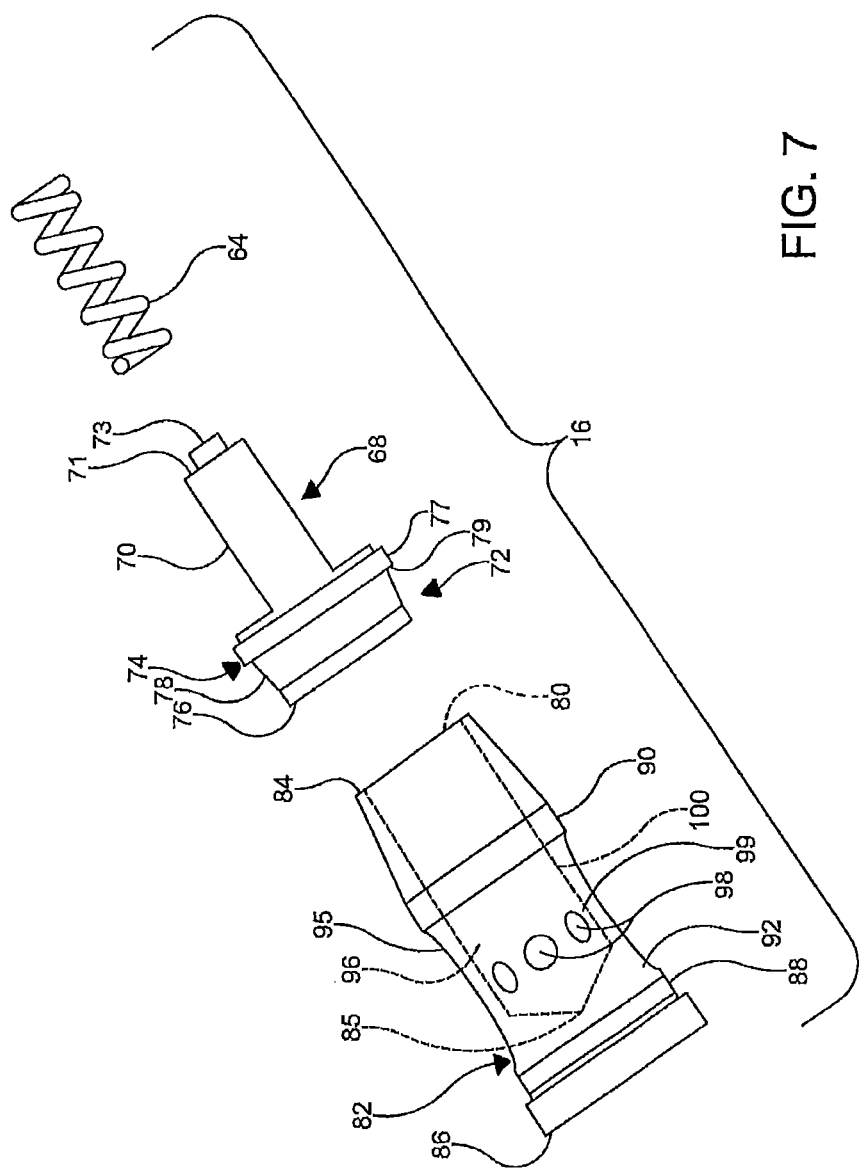
FIG. 7 is an exploded view of an embodiment of a valve assembly of the rotary joint assembly of FIG. 1.

As best illustrated in FIG. 7, the valve assembly 16 also comprises a biasing member 64. In an embodiment, the biasing member 64 is disposed in the first diameter portion 58 of the chamber 44. The biasing member 64 applies a bias to a piston 68. In an embodiment, the bias applied to the piston 68 by the biasing member 64 urges the piston 68 to place the valve assembly 16 into the closed position. In this embodiment, the bias applied to the piston 68 by the biasing member 64 urges the piston 68 toward the second diameter portion 54 of the chamber 44 and the main body portion 82 of the valve assembly 16. However, in other embodiments (not depicted), the bias applied to the piston by the biasing member may urge the piston so that the valve assembly is placed into an open position.

Thus, the piston 68 is moveable within the chamber 44 and the movement of the piston 68 places the valve assembly 16 into an open position or the closed position. Preferably, the biasing member 64 is a spring. More preferably, the biasing member 64 is a coil spring. In these embodiments, the biasing member 64 may be formed of a spring steel. In an embodiment, an end of the biasing member 64 contacts an end surface 66 of the first diameter portion 58. In this embodiment, an opposite end of the biasing member 64 contacts the piston 68. The biasing member 64 extends or is compressed in response to the movement of the piston 68. For example, when the piston 68 moves toward the main body portion 82, the basing member 64 extends toward the second diameter portion 54 of the chamber 44. When the piston 68 moves away from the main body portion 82, the biasing member 64 is compressed and moves away from the second diameter portion 54 of the chamber 44.

The piston 68 comprises a stem portion 70. The stem portion 70 is at least partially disposed with the first diameter portion 58 of the chamber 44. In an embodiment, the stem portion 70 is of a cylindrical shape and has a diameter which is smaller than the diameter of the first diameter portion 58. The stem portion 70 also comprises an end surface 71. The biasing member 64 biases the piston 68 via contact with the end surface 71 of the stem portion 70. In an embodiment, a guide portion 73 is attached to the end surface 71. In the embodiment illustrated in FIG. 7, the guide portion 73 is of a cylindrical shape. In this embodiment, the end surface 71 is annular. However, it should be appreciated that the guide portion may be of another shape. Also, if the guide portion is not provided, the end surface of the stem portion may be of a circular shape or another suitable shape. As illustrated in FIG. 2, an end portion of the biasing member 64 is positioned around the guide portion 73 to ensure that the biasing member 64 contacts the end surface 71 in a consistent position so that the bias providing by the biasing member 64 is applied to the piston 68 in a consistent manner.

Referring back to FIG. 7, the stem portion 70 is attached to a sealing portion 72 of the piston 68. The sealing portion 72 is disposed within the second diameter portion 54 of the chamber 44. The sealing portion 72 has a diameter which gradually decreases toward a sealing surface 76 of the sealing portion 72. The diameter of the sealing portion 72 is greater than the diameter of the stem portion 70. However, the diameter of the sealing portion 72 is less than the diameter of the second diameter portion 54. The sealing portion 72 comprises a lip portion 74 and the sealing surface 76. The lip portion 74 is separated from the sealing surface 76 by a frusto-conical shaped portion 78. Preferably, the lip portion 74 and the sealing surface 76 are each formed from an elastomeric material.

The lip portion 74 comprises a side surface 77. The side surface 77 seals against the portion of the wall portion 54 that defines the second diameter portion 54 of the chamber 44. The lip portion 74 also comprises an annular surface 79. Pressurized air, which is communicated through the second air passageway 46, from the tire pressure management system applies a bias to the piston 68 via the frusto-conical shaped portion 78 and the annular surface 79. For example, when the valve assembly 16 is in the closed position, pressurized air from the tire pressure management system is communicated through the second air passageway 46 and the pressurized air acts on the frusto-conical shaped portion 78 and the annular surface 79 to open the valve assembly 16 so that the tire pressure can be increased or decreased. In this embodiment, the pressurized air communicated through the second air passageway 46 urges the piston 68 away from the main body portion 82 and toward the first diameter portion 58 of the chamber 44 to open the valve assembly 16.

The sealing surface 76 selectively provides a seal around an opening 80 in the main body portion 82 of the valve assembly 16. The opening 80 is provided in an open end 84 of the main body portion 82. In an embodiment, the opening 80 has a circular shape. In this embodiment, the sealing surface 76 may have a circular shape and be of a diameter which is greater than a diameter of the opening 80. However, it should be appreciated that the opening and the sealing surface may each be of other shapes.

The sealing surface 76 is provided adjacent the open end 84 of the main body portion 82. When the seal is provided around the opening 80 by the sealing surface 76, the valve assembly 16 is in the closed position. When the seal is not provided around the opening 80, the valve assembly 16 is in an open position. The sealing surface 76 provides another surface for pressurized air from the wheel assembly 12 or the tire pressure management system to apply a bias to the piston 68. For example, when the tire pressure is being decreased, pressurized air from the tire pressure management system may be pulsed into a second space 102. Under these conditions and in the second space 102, the pressurized air acts on the frusto-conical shaped portion 78 and the annular surface 79 to urge the piston 68 toward the first diameter portion 58 of the chamber 44. When the tire pressure is being increased, pressurized air from the tire pressure management system also acts on the frusto-conical shaped portion 78 and the annular surface 79 and urges the piston 68 toward the first diameter portion 58 of the chamber 44.

The main body portion 82 is positioned in the second diameter portion 54 of the chamber 44. The main body portion 82 is of a generally cylindrical shape. The main body portion 82 has an inner cavity 96 which extends from the open end 84 to an end wall 85. The inner cavity 96 is defined by an inner surface 100 of the main body portion 82. In an embodiment, the inner cavity 96 is of a generally cylindrical shape.

The end wall 85 defines a closed end 86 of the main body portion 82. When the valve assembly 16 is in the closed position, fluid communication is prevented through the opening 80 by the sealing surface 76. When the valve assembly 16 is in an open position, fluid communication through the valve assembly 16 is provided through the open end 84 of the main body portion 82.

Figure 3:
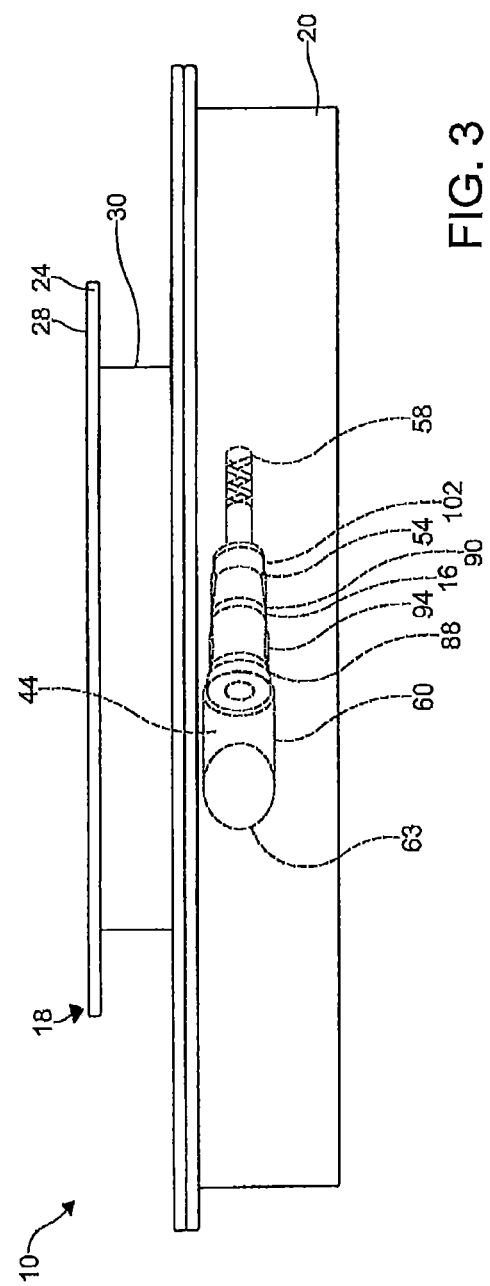
FIG. 3 is side view of the rotary joint assembly of FIG. 1.

Referring now to FIGS. 3 and 7, a first annular sealing member 88 and a second annular sealing member 90 are provided on an outer surface 92 of the main body portion 82. The annular sealing members 88, 90 are spaced apart from each other and provide separate seals between the wall portion 54 defining the second diameter portion 54 of the chamber 44 and the outer surface 92 of the main body portion 82. Preferably, the annular sealing members 88, 90 are each formed of an elastomeric material. In an embodiment, the annular sealing members 88, 90 are each an O-ring.

A first space 94 is defined between the annular sealing members 88, 90, the wall portion 54, and a portion 95 of the outer surface 92 of the main body portion 82 that is between the annular sealing members 88, 90. The portion 95 of the outer surface 92 between the annular sealing members 88, 90 may be of a generally cylindrical shape. The first air passageway 42 is in fluid communication with the first space 94. The first space 94 is in fluid communication with the inner cavity 96 via one or more apertures 98 provided in the main body portion 82. The apertures 98 are formed through a portion 99 of the main body portion 82 that is provided between the annular sealing members 88, 90.

As illustrated best in FIG. 3, the second space 102 is provided between the second annular sealing member 90 and the lip portion 74 of the piston 68. The second space 102 is in fluid communication with the second air passageway 46. The second space 102 is of a volume which is variable. For example, the volume of the second space 102 increases when the valve assembly 16 is moved from the closed position into an open position. Alternatively, the volume of the second space 102 decreases when the valve assembly 16 is moved from an open position to the closed position. The pressurized air communicated through the second air passageway 46, which applies a bias to the piston 68 via the frusto-conical shaped portion 78 and the annular surface 79 when the valve assembly 16 is in the closed position, is in fluid communication with the frusto-conical shaped portion 78 and the annular surface 79 via the second space 102.

Figure 4:
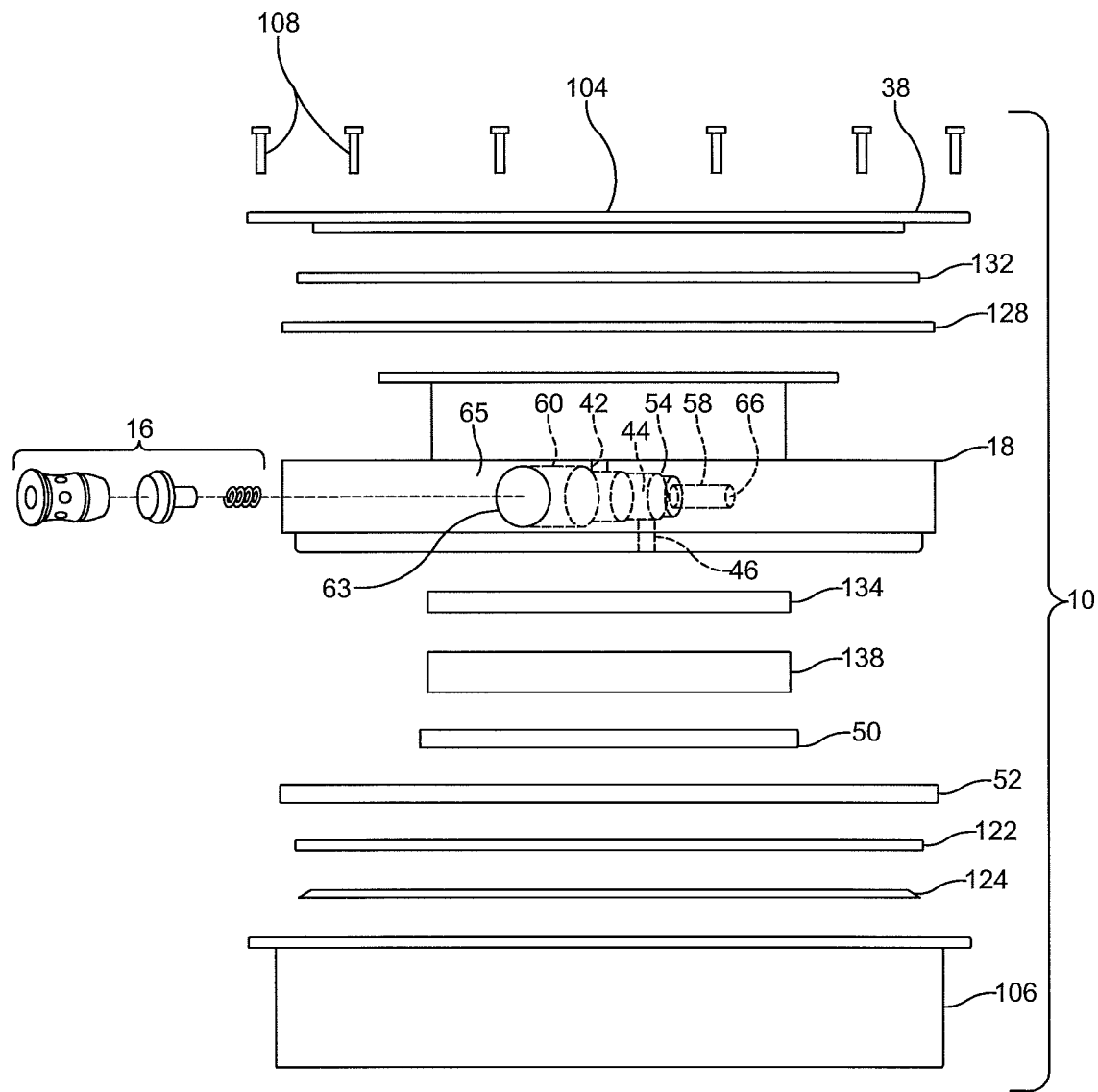
FIG. 4 is an exploded view of the rotary joint assembly of FIG. 1.
Figure 5:
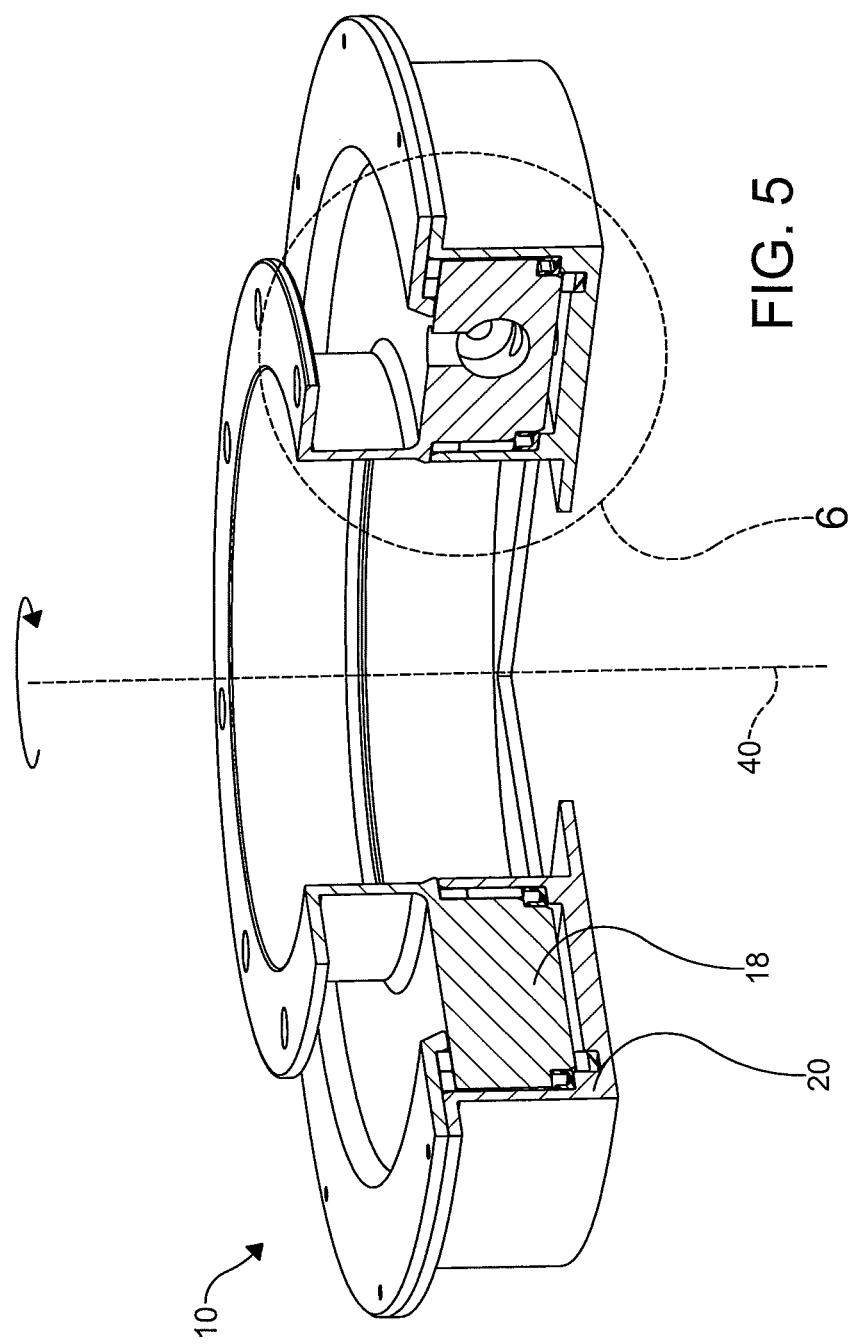
FIG. 5 is a sectional view of the rotary joint assembly of FIG. 1, with the valve assembly removed for clarity, taken along line 5-5 of FIG. 2.

As noted above, the non-rotating portion 20 is directly attached to a non-rotating portion of the vehicle such as, for example, the axle housing 14. Preferably and as illustrated in FIG. 4, the non-rotating portion 20 is formed from a first portion 104 and a second portion 106. The first portion 104 and second portion 106 are each generally annular bodies that are coupled together by a plurality of fasteners 108.

Figure 6:
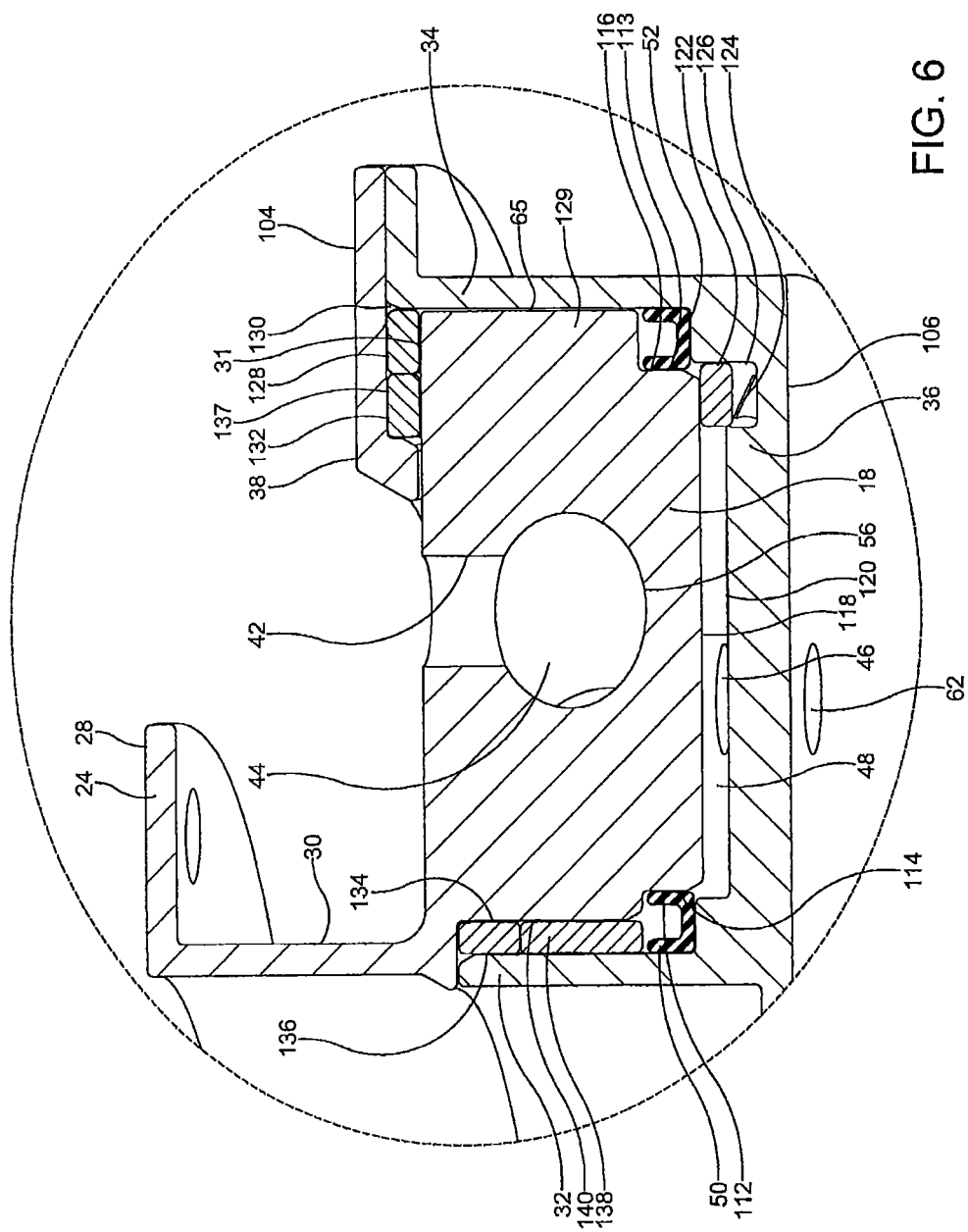
FIG. 6 is an enlarged perspective view of a portion of the rotary joint assembly of FIG. 5.

Referring now to FIGS. 4 and 6, the first portion 104 defines the outboard end wall 38 of the non-rotating portion 20. The first portion 104 is disposed radially out from and around a portion of the axially extending portion 30 of the torque plate 24. The second portion 106 defines the inboard end wall 36, the inner sidewall 32 and the outer sidewall 34 of the non-rotating portion 20. The inboard end wall 36 is provided in a generally perpendicular relationship with the inner sidewall 32 and outer sidewall 34 and is in a generally parallel relationship with the outboard end wall 38. The inboard end wall 36 and the outboard end wall 38 are separated from each other by the outer sidewall 34. The inner sidewall 32 and outer sidewall 34 are provided in a generally parallel relationship with each other and are separated from each other by the rotating portion 18. The inner sidewall 32 at least partially defines the central aperture 15.

Referring now to FIG. 6, the third air passageway 62 is formed through the inboard end wall 36. In an embodiment, the third air passageway 62 is of a cylindrical shape. On an end, the third air passageway 62 is in fluid communication with selected portions (not depicted) of the tire pressure management system. On an opposite end, the third air passageway 62 is in fluid communication with the space 48 provided between the rotating portion 18 and the non-rotating portion 20. More particularly, the space 48 is provided between an inboard surface 118 of the rotating portion 18 and an outboard surface 120 of the inboard end wall 36. Sealing the space 48 allows pressurized air to be transferred from the rotating portion 18 to the non-rotating portion 20 and vice versa. The third air passageway 62 and the second air passageway 46 are in fluid communication with each other via the sealed space 48.

The space 48 is annular and, as noted above, sealed by the first annular air seal member 50 and the second annular air seal member 52. The first annular air seal member 50 and the second annular air seal member 52 are disposed between the rotating portion 18 and non-rotating portion 20. More specifically, the first annular air seal member 50 is attached to the inner sidewall 32 and the second annular air seal member 52 is attached to the outer sidewall 34 and a surface 112, 113 of each annular air seal member 50, 52 is sealingly engaged with an opposing surface 114, 116 of the rotating portion 18.

The annular air seal members 50, 52 can be formed from any suitable material(s). Preferably, each annular air seal member 50, 52 comprises a carrier material. The carrier material may be formed from a suitable metal. Preferably, the carrier material is coated with an elastomeric material. Preferably, the elastomeric material is resistant to any fluid that may contact the rotary joint assembly 10.

To maintain the annular shape of the space 48 between the rotating portion 18 and the non-rotating portion 20 and limit the axial movement of the rotating portion 18 relative to the non-rotating portion 20, a first axial spacing member 122 is provided in the space 48 and between the rotating portion 18 relative to the non-rotating portion 20. Preferably, the first axial spacing member 122 is an annular bushing. The first axial spacing member 122 contacts the inboard surface 118 of the rotating portion 18. In an embodiment, the first axial spacing member 122 is biased against the inboard surface 118 of the rotating member 18 via an annular biasing member 124. Preferably, the annular biasing member 124 is a wave spring. In this embodiment, the annular biasing member 124 is provided in an annular groove 126 formed in the inboard end wall 36 of the non-rotating portion 20. The annular biasing member 124 may be formed from a spring steel.

To further limit the axial movement of the rotating portion 18 relative to the non-rotating portion 20, a second axial spacing member 128 contacts the outboard surface 31 of the rotating portion 18. The second axial spacing member 128 is provided in a groove 130 formed in the non-rotating portion 20. Preferably, the second axial spacing member 128 is an annular bushing. The first axial spacing member 122 and the second axial spacing member 128 are separated from each other by an outer end portion 129 of the rotating portion 18.

The first axial spacing member 122 and the second axial spacing member 128 may comprise a wear resistant, low friction material to reduce friction between each member 122, 128 and the rotating portion 18. Suitable wear resistant, low friction materials include plastics such as, for example, a PTFE loaded thermoplastic and other like materials. In an embodiment (not depicted), the axial spacing members 122, 128 may each be a coating formed from such a material and provided in a generally annular shape or be of another suitable ring-shaped member having a rectangular-shape in cross-section.

A first annular seal member 132 and a second annular seal member 134 are disposed between the rotating portion 18 and non-rotating portion 20. The annular seal members 132, 134 are attached to separate surfaces 136, 137 of the non-rotating portion 20 and sealingly contact surfaces 31, 140 of the rotating portion 18 to prevent dirt and debris from entering the rotary joint assembly 10 by passing between the rotating portion 18 and non-rotating portion 20. The first annular seal member 132 is positioned adjacent the second axial spacing member 128 and contacts the outboard surface 31 of the rotating portion 18. The second annular seal member 134 is positioned adjacent a radial spacing member 138 and contacts the inner surface 140 of the rotating portion 18.

The radial spacing member 138 limits the radial movement of the rotating portion 18 relative to the non-rotating portion 20. The radial spacing member 138 is positioned between the non-rotating portion 20 and the rotating portion 18. More particularly, the radial spacing member 138 is attached to the inner sidewall 32 of the non-rotating portion 20 and contacts the inner surface 140 of rotating portion 18. The radial spacing member 138 is positioned between the second annular sealing member 134 and the first annular air seal member 50. The radial spacing member 138 may comprise a wear resistant, low friction material to reduce friction between the member 138 and the rotating portion 18. Suitable wear resistant, low friction materials include plastics such as, for example, a PTFE loaded thermoplastic and other like materials. In an embodiment (not depicted), the radial spacing member 138 may each be a coating formed from such a material and provided in a generally annular shape or be of another suitable ring-shaped member having a rectangular-shape in cross-section. Preferably, the radial spacing member 138 is an annular bushing.

When it is desired to place the valve assembly 16 in an open position in order to increase or decrease the tire pressure, a flow of pressurized air from the tire pressure management system is directed to and through the third air passageway 62. The pressurized air is at a pressure which is greater than the tire pressure. From the third air passageway 62, the pressurized air enters the space 48 between the rotating portion 18 and the non-rotating portion 20. From the space 48, the pressurized air is directed in the second air passageway 46. From the second air passageway 46, the pressurized air enters the second space 102 where it acts on the lip portion 74 and the frusto-conical shaped portion 78 of the piston 68 and urges the piston 68 away from the main body portion 82 of the valve assembly 16 and toward the first diameter portion 58 of the chamber 44. Urging the piston 68 away from the main body portion 82 compresses the biasing member 64. As the piston 68 moves away from the main body portion 82, the valve assembly 16 is placed into an open position. Placing the valve assembly 16 into an open position allows a flow of pressurized air from the tire pressure management system to be introduced into the wheel assembly 12 to increase the tire pressure or allows a flow of pressurized air to be directed from the wheel assembly 12 to another portion of the tire pressure management system to decrease the tire pressure.

When it is desired to increase the tire pressure, pressurized air from the tire pressure management system is directed to the wheel assembly 12. In this embodiment and when the valve assembly is in an open position, pressurized air from the tire pressure management system enters the rotary joint assembly 10 via the third air passageway 62. From the third air passageway 62, the pressurized air from the tire pressure management system enters the space 48 between the rotating portion 18 and the non-rotating portion 20. From the space 48, the pressurized air from the tire pressure management system is directed to the second air passageway 46. From the second air passageway 46, the pressurized air from the tire pressure management system enters the second space 102. In the second space 102, the pressurized air from the tire pressure management system acts on the lip portion 74, the sealing surface 76, and the frusto-conical shaped portion 78 of the piston 68 to maintain the valve assembly 16 in an open position. From the second space 102, the pressurized air from the tire pressure management system enters the valve assembly 16 through the opening 80 in the open end 84 of the main body portion 82. The pressurized air is directed through the inner cavity 96 and the apertures 98 to the first space 94. From the first space 94, the pressurized air from the tire pressure management system is directed to and through the first air passageway 42. From the first air passageway 42, the pressurized air from the tire pressure management system is directed to the wheel assembly 12 via a fluid conduit (not depicted) to increase the tire pressure. When the desired increase in tire pressure has been achieved, the valve assembly 16 is placed into the closed position to prevent additional pressurized air from being introduced into the wheel assembly 12.

When it is desired to decrease the tire pressure, pressurized air from the wheel assembly 12 is directed to a portion of the tire pressure management system for venting to the atmosphere. In this embodiment and when the valve assembly is in an open position, a flow of pressurized air from the wheel assembly 12 is directed to the first air passageway 42. From the first air passageway 42, the pressurized air from the wheel assembly 12 is directed into the first space 94 and into the valve assembly 16 through the apertures 98 to the inner cavity 96. From the inner cavity 96, the pressurized air from the wheel assembly 12 is directed through the opening 80 in the open end 84 of the main body portion 82. From the opening 80, the pressurized air from the wheel assembly 12 enters the second space 102 and acts on the lip portion 74, the sealing surface 76, and the frusto-conical shaped portion 78 of the piston 68 to maintain the valve assembly 16 in an open position. From the second space 102, the pressurized air from the wheel assembly 12 is directed to and through the second air passageway 46. From the second air passageway 46, the pressurized air from the wheel assembly 12 is directed into the space 48 and to the third air passageway 62 in the non-rotating portion 20 of the rotary joint assembly 10. From the third air passageway 62, the pressurized air is directed through one or more portions of the tire pressure management system and vented to the atmosphere. When the desired decrease in tire pressure has been achieved, the valve assembly 16 is placed into the closed position to prevent additional pressurized air from being released from the wheel assembly 12.

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:

1. A rotary joint assembly for a tire pressure management system, comprising:
    a rotating portion having a first air passageway and a second air passageway, the first air passageway and the second air passageway being in fluid communication with a chamber formed in the rotating portion;
    a non-rotating portion having a third air passageway, an inner sidewall, and an outer sidewall, wherein the rotating portion is disposed between the inner sidewall and the outer sidewall and the third air passageway being in fluid communication with the second air passageway through a sealed space provided between the rotating portion and the non-rotating portion; and
    a valve assembly positioned within the chamber, the valve assembly comprising a piston and a biasing member and allowing a flow of pressurized air to be directed from the first air passageway to the third air passageway or a flow of pressurized air to be directed from the third air passageway to the first air passageway.

2. The rotary joint assembly of claim 1, wherein the chamber comprises a first diameter portion and a second diameter portion and the biasing member is disposed in the first diameter portion.

3. The rotary joint assembly of claim 1, wherein the rotating portion rotates about an axis of rotation, the axis of rotation extending through a central aperture which is at least partially defined by a portion of the non-rotating portion.

4. The rotary joint assembly of claim 1, wherein the piston comprises a stem portion, which is contacted by the biasing member, and a sealing portion, which is attached to the stem portion and has a diameter that is greater than a diameter of the stem portion.

5. The rotary joint assembly of claim 1, wherein the valve assembly also comprises a main body portion, wherein the biasing member is positioned in a first diameter portion of the chamber and the main body portion is positioned in a second diameter portion of the chamber.

6. The rotary joint assembly of claim 1, wherein the second air passageway is in fluid communication with the valve assembly through a space, the space having a volume which is variable.

7. The rotary joint assembly of claim 1, wherein the non-rotating portion comprises a first portion and a second portion, which is coupled to the first portion, wherein the first portion defines an outboard end wall and the second portion defines an inboard end wall, the outboard end wall and the inboard end wall being in a generally parallel relationship with each other.

8. The rotary joint assembly of claim 1, further comprising a first axial spacing member positioned in the sealed space provided between the rotating portion and the non-rotating portion.

9. The rotary joint assembly of claim 1, further comprising a radial spacing member positioned between an innermost surface of the rotating portion and an inner sidewall of the non-rotating portion, the radial spacing member limiting the radial movement of the rotating portion relative to the non-rotating portion.

10. The rotary joint assembly of claim 2, wherein the biasing member applies a bias to the piston which urges the piston toward the second diameter portion.

11. The rotary joint assembly of claim 3, wherein the first air passageway and the second air passageway are each in a parallel relationship with the axis of rotation.

12. The rotary joint assembly of claim 4, wherein the sealing portion comprises a lip portion and a sealing surface, wherein the lip portion seals against a wall portion defining the chamber and the sealing surface is provided adjacent an open end of a main body portion of the valve assembly.

13. The rotary joint assembly of claim 5, further comprising a pair of annular sealing members provided on an outer surface of the main body portion, the annular sealing members providing separate seals between a wall portion which defines the chamber and the main body portion.

14. The rotary joint assembly of claim 6, wherein the volume of the space increases when the valve assembly is moved into the open position and the volume of the space decreases when the valve assembly is moved into the closed position.

15. The rotary joint assembly of claim 7, wherein the third air passageway is formed through the inboard end wall.

16. The rotary joint assembly of claim 8, wherein the first axial spacing member is contacted by an annular biasing member to bias the first axial spacing member against an inboard surface of the rotating portion, the annular biasing member being provided in an annular groove formed in an inboard end wall of the non-rotating portion.

17. The rotary joint assembly of claim 8, further comprising a second axial spacing member, the second axial spacing member separated from the first axial spacing member by a portion of the rotating portion and provided in a groove formed in the non-rotating portion, wherein the second axial spacing member contacts an outboard surface of the rotating portion to limit the axial movement of the rotating portion relative to the non-rotating portion.

18. The rotary joint assembly of claim 13, wherein a first space is provided between the pair of annular sealing members and the first space is in fluid communication with the first air passageway and an inner cavity defined by an inner surface of the main body portion.

19. A rotary joint assembly for a tire pressure management system, comprising:
a rotating portion having a first air passageway and a second air passageway, the first air passageway and the second air passageway being in fluid communication with a chamber formed in the rotating portion, the rotating portion having an axis of rotation and the chamber being positioned generally oblique to the axis of rotation;
a non-rotating portion having a third air passageway, the third air passageway being in fluid communication with the second air passageway through a space provided between the rotating portion and the non-rotating portion, the space being sealed by a first annular air seal member and a second annular air seal member; and
a valve assembly positioned within the chamber, the valve assembly comprising a piston and a biasing member, the biasing member applying a bias to the piston and the piston having a sealing surface which selectively provides a seal around an opening in a main body portion of the valve assembly, wherein the valve assembly allows a flow of pressurized air to be directed from the first air passageway to the third air passageway or a flow of pressurized air to be directed from the third air passageway to the first air passageway.

20. The rotary joint assembly of claim 19, wherein the chamber comprises a first diameter portion and a second diameter portion and the biasing member is positioned in the first diameter portion and biases the piston toward the main body portion which is positioned in the second diameter portion.

* * * * *